J. A. WILKINSON.
AUTOMOBILE ATTACHMENT.
APPLICATION FILED OCT. 19, 1910.
998,314.
Patented July 18, 1911.
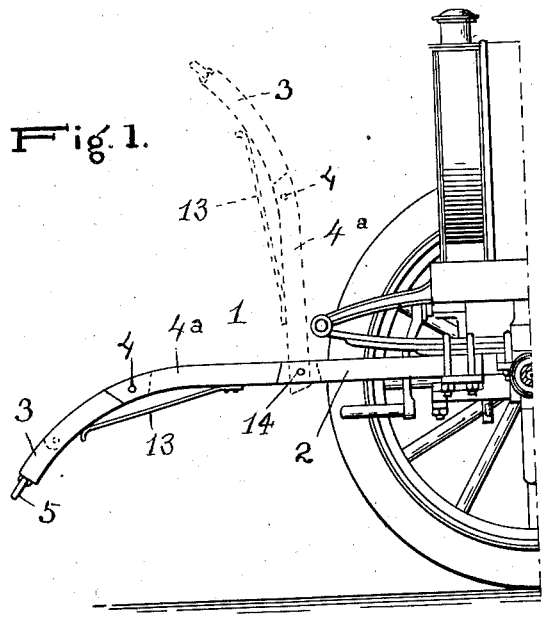
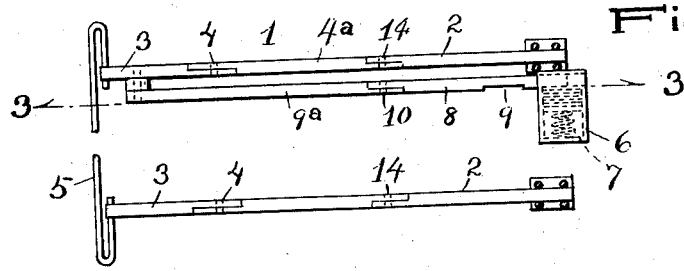
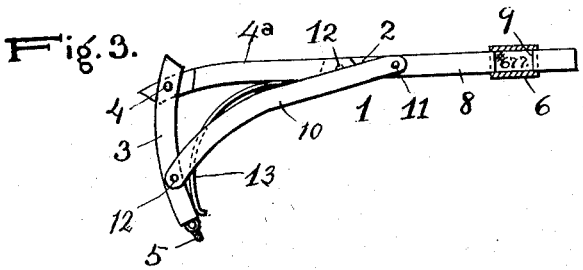
Witnesses
Stuart Hilder.
Frances M. Anderson.
Inventor
J. A. Wilkinson.
by E. W. Anderson & Son
his Attorneys

UNITED STATES PATENT OFFICE.

JOSEPH A. WILKINSON, OF EUREKA, KANSAS.

AUTOMOBILE ATTACHMENT.

998,314.

Specification of Letters Patent. Patented July 18, 1911.

Application filed October 19, 1910. Serial No. 587,966.

*To all whom it may concern:*

Be it known that I, JOSEPH A. WILKINSON, a citizen of the United States, resident of Eureka, in the county of Greenwood and State of Kansas, have made a certain new and useful Invention in Automobile Attachments; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a side view of the invention as applied, with the upthrown position thereof shown in dotted lines. Fig. 2 is a plan view of the invention with the two side parts brought somewhat together and the fender part broken away in the middle. Fig. 3 is a side view of the invention with the parts thereof in the positions assumed when an obstruction has been struck.

The invention has relation to motor car attachments having for its object to throw out or cause to escape an identification card or check bearing the number of the machine and the State or source of the license number should the car collide with an obstruction such as a human being.

In the accompanying drawings illustrating the invention, the numeral 1 designates a forward extending frame composed of rear sections or bars 2, 2, clipped to the front axle of the machine below the springs at each side, and front sections or bars 3, 3, pivoted to the forward ends of the rear sections at 4, 4, and preferably of downward curved formation, as shown, said front sections having a cross rod or fender connection 5, which when striking a person in the way of the machine, will act to throw said front sections down out of line with the rear sections, as shown in Fig. 3 of the drawings.

The check box is shown at 6, and is provided with a number of cards or checks placed one behind the other and pressed toward the outlet end of the check box by a spring 7. Working in the outlet end of the check box is a slidable bar 8, having a lateral slot or notch 9, of proper dimensions to receive therein one check. This slidable bar normally bars the escape of the check, which is pressed against the end of the bar by the spring 7. When the slidable bar is moved rearward through contact of the fender with the obstruction the lateral notch of said bar will be brought in line with the check, and the check will enter the notch through the action of the spring, and will be carried forward with said bar on the recoil thereof out of the check box, when it will fall through gravity from the notch out upon the ground.

The operation of the sliding check bar is brought about by a connecting rod 10, having a pivotal connection with the forward end of the check bar at 11, and at its forward end a pivotal connection with one of the front sections 3 at 12, whereby when said front section is thrown downward as stated, the check bar will be actuated to receive the check. The recoil of the check bar is brought about by springs 13 carried by each rear section 4, and bearing against each front section 3 in such manner as to automatically return the front sections to normal position and at the same time to return the check bar to normal position to throw out the check. The rear sections 4, 4, are made of jointed character the joints thereof having a pivotal connection as shown at 14, and thus allowing the front joints 4ª, with the front sections 3, 3, to be thrown upward out of the way, when the engine is to be cranked.

In this way it is designed to render it impossible for an accident to occur to anyone through collision with a motor car, and the machine and driver escape without leaving behind means of identification.

Having thus described my invention, what I claim as new and desire to secure by Letters Patent is:—

1. An attachment for motor cars comprising a jointed frame provided with a fender, a check box carrying a plurality of identification checks, and a slidable bar having connection with said frame for causing the escape of a check from the check box upon contact of the fender with an obstruction such as a human being.

2. An attachment for motor cars, comprising a frame composed of front and rear pivotally connected sections, a fender carried by the front sections, a check box carrying a plurality of identification checks, and a slidable bar having connection with a front section of said frame to cause the escape of a check from said check box upon contact of the fender with an obstruction such as a human being.

3. An attachment for motor cars, comprising a frame composed of front and rear pivotally connected sections, a fender carried by the front sections, a check box carrying a plurality of identification checks having a pressure spring behind the same, a slidable bar having pivotal connection with a front section, and a spring for automatically returning the slidable bar and front sections to normal position to cause the escape of a check from the check box upon contact of the fender with an obstruction such as a human being.

4. An attachment for motor cars, comprising a frame composed of front and rear pivotally connected sections upon each side, a fender connecting and carried by the front sections, a check box carrying a plurality of identification checks having a pressure spring behind the same, a slidable bar having pivotal connection with one of the front sections and working in the check box, said bar having a notch of proper dimensions to receive one check, a spring for automatically returning the slidable bar and the front sections to normal position to cause the escape of a check from the check box upon contact of the fender with an obstruction such as a human being, the rear sections of said frame having pivotal joints to allow the projecting parts to be thrown upward out of the way when the engine is to be cranked.

In testimony whereof I affix my signature, in presence of two witnesses.

JOSEPH A. WILKINSON.

Witnesses:
    FRANK GROOM,
    W. R. PEOPLES.